Feb. 19, 1929.
J. ESTELL
1,702,295
AGRICULTURAL IMPLEMENT
Filed March 1, 1926
3 Sheets-Sheet 3
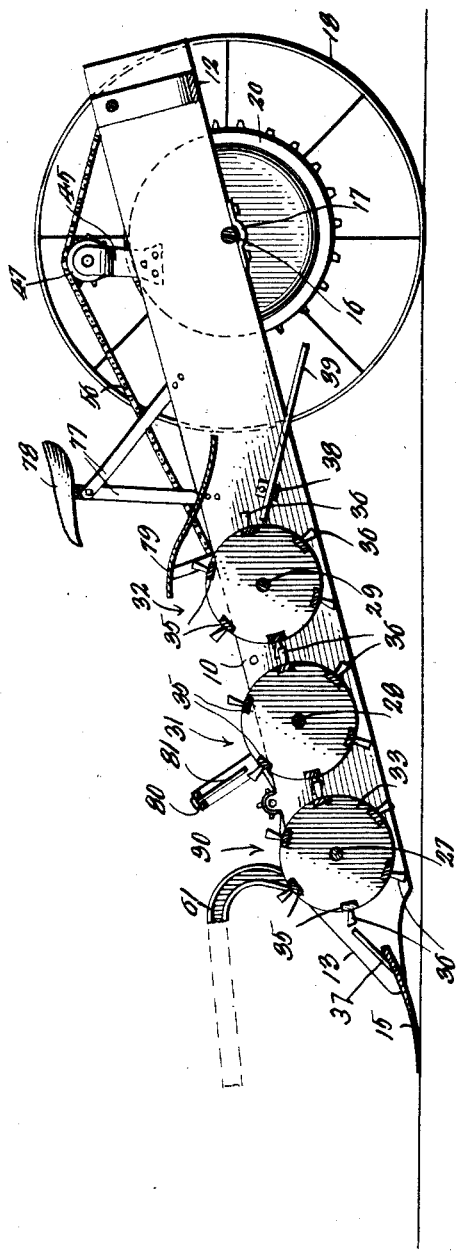
WITNESSES.
INVENTOR.
JOHN ESTELL
BY
ATTORNEY.

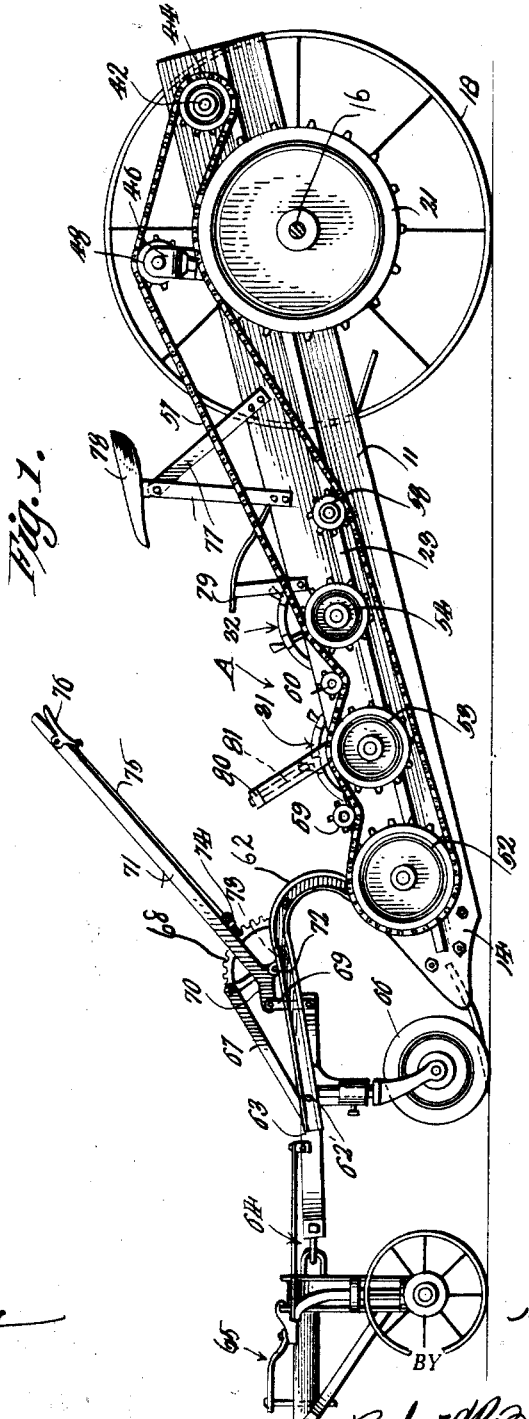

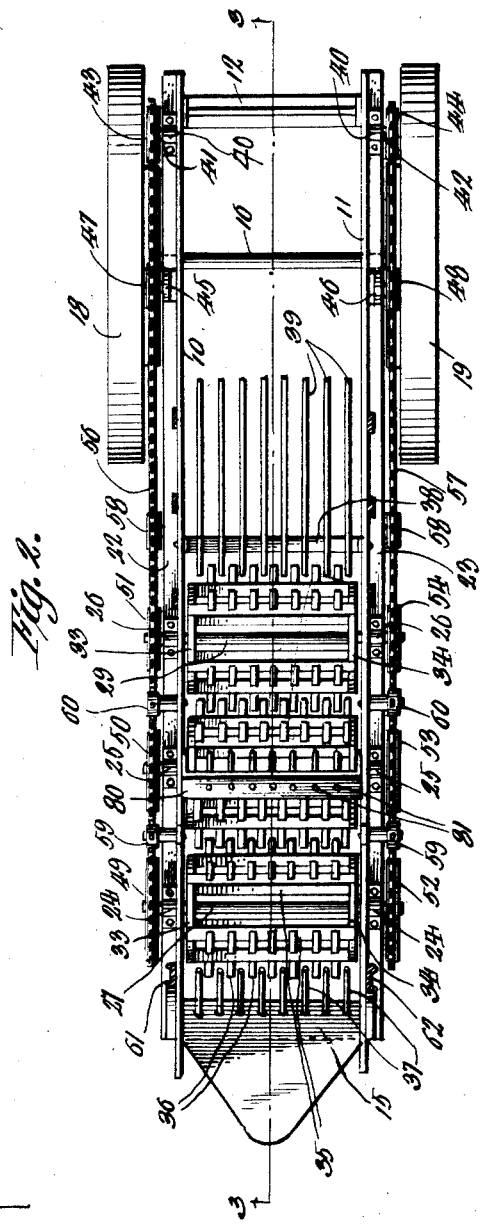

Patented Feb. 19, 1929.

1,702,295

UNITED STATES PATENT OFFICE.

JOHN ESTELL, OF ELKTON, SOUTH DAKOTA.

AGRICULTURAL IMPLEMENT.

Application filed March 1, 1926. Serial No. 91,609.

This invention relates broadly to new and useful improvements in agricultural implements and has more particular reference to a novel and simplified machine for destroying quack grass.

It is well known that in some sections of the country, the farm lands are covered with such a growth of quack grass that it is almost impossible to do practical farming on this land and the present invention therefore has for its principal object the provision of a machine primarily designed for removing this growth of quack grass from the land and leaving the soil in excellent condition for the crops.

Another object of the present invention is the provision of such a machine which will dig up the sod and remove the quack grass from the soil in a single cultivating operation.

Another object of the present invention is to provide a machine having means for cutting the quack sod together with new and novel means for adjusting the cutter so that it will cut the sod the desired thickness according to the growth of the quack grass.

Another object of the present invention is to provide such a machine which will effectively cut the sod, separate the quack roots from the soil, permit the soil to return to the ground, and gather the quack roots in a single cultivating operation.

A further object of the present invention is the provision of such a machine which while simple in construction is nevertheless strong, sturdy and durable, one that is efficient and reliable in operation, cheap to manufacture and which may be placed on the market at a reasonable figure.

With these and other objects in view, the invention resides in the novel construction, combination and arrangement of parts to be more fully hereinafter described, illustrated in the accompanying drawings and particularly pointed out in the appended claims.

In the drawings forming a part of this application and wherein like characters of reference denote corresponding parts throughout the several views:

Figure 1 is a side elevation of a machine constructed in accordance with the present invention, partially in section.

Figure 2 is a top plan view thereof.

Figure 3 is a longitudinal sectional view on line 3—3 of Figure 2.

Referring more particularly to the accompanying drawings, wherein for the purpose of illustration has been disclosed a preferred embodiment of the present invention, the improved machine is designated as a whole by the letter A and comprises in its construction a frame including the elongated side walls 10 and 11 connected at their rear ends by means of the transverse brace 12, said side walls being substantially tapered at their forward ends as indicated at 13 and 14 and being connected by means of the forwardly projecting sod shearing element 15.

Journaled within the side walls 10 and 11 adjacent the rear ends thereof and immediately adjacent their lower edges is the transversely extending axle 16, supported in position by means of the bearing brackets 17 secured to the lower edges of the said side walls. Mounted on the opposite ends of the axle 16 outwardly of the frame are the ground or frame supporting wheels 18 and 19 and further mounted on said axle between the supporting wheels and the side walls of the frame are the sprocket wheels 20 and 21.

Secured to the outer faces of the side walls 10 and 11 intermediate the upper and lower edges thereof are the longitudinally extending supporting bars 22 and 23 carrying the three pairs of oppositely disposed bearing brackets 24, 25 and 26 and journaled in the side walls 10 and 11, and also in the pairs of brackets 24, 25 and 26, are the ends of transverse shafts 27, 28 and 29 respectively, said shafts projecting beyond the said side walls 10 and 11. Mounted on the said shafts 27, 28 and 29 between the said side walls 10 and 11 are the cylinders 30, 31 and 32 respectively, each comprising the circular heads 33 and 34 connected by means of the transverse bars 35 secured at equally spaced distances around the peripheries thereof. Each of the bars 35 is provided with a plurality of spaced outwardly projecting teeth 36 and by reference to Figure 2, it will be seen that the teeth of the three cylinders 30, 31 and 32 are arranged in staggered relation so that upon the rotation of the cylinders they will pass between one another.

The shearing element 15 is provided adjacent the rear edge thereof with the plurality of upwardly and rearwardly extending teeth 37 which are arranged in staggered relation with the teeth of the forward cylinder 30 while secured to and extending between the side walls of the frame adjacent the rear cylinder 32 is an angularly disposed bracket 38 and carried by said bracket are a plurality of downwardly and rearwardly slanting conveyor arms 39, said arms extending forwardly of the bracket 38 and being arranged in staggered relation with the teeth of the cylinder 32 so as not to interfere with the rotation of the latter.

Secured to the longitudinally extending supporting bars 22 and 23 adjacent the rear ends thereof are the oppositely positioned bearing brackets 40 within which are mounted the stub shafts 41 and 42 carrying the sprocket gears 43 and 44 respectively while secured to the side walls 10 and 11 of the frame are the oppositely positioned upstanding brackets 45 and 46 within which are rotatably mounted the sprocket gears 47 and 48 respectively.

Carried on the ends of the shafts 27, 28 and 29 outwardly of and adjacent the side wall 10 are the sprocket gears 49, 50 and 51 while carried by the opposite ends of the said shafts outwardly of and adjacent the side wall 11 are the sprocket gears 52, 53 and 54 and it will be noted from the drawing that the gears 51 and 54 carried by the shaft 29 are smaller than the gears carried by the shafts 27 and 28 and that the gears 50 and 53 carried by the shaft 28 are slightly smaller than the gears 49 and 52 carried by the shaft 27.

An endless chain 56 is arranged adjacent the side wall 10 and is trained over the sprocket gears 49, 50 and 51 carried by the shafts 27, 28 and 29 and also over the sprocket gear 47 and around the sprocket gear 43 while a similar sprocket chain 57 is positioned adjacent the side wall 11 and is trained over the sprocket gears 52, 53 and 54 carried by the shafts 27, 28 and 29 and also over the sprocket gear 48 and around the sprocket gear 44.

The lower runs of these chains 56 and 57 are engaged respectively with the sprocket wheels 20 and 21 carried by the shaft 16, while the said lower runs of the chains are held from engagement with the gears 50 and 51, and 53 and 54 by means of the sprocket gears 58 mounted upon stub shafts on the longitudinally extending supporting bars 20 and 21.

Also carried by the side walls 10 and 11 outwardly thereof are the sprocket gears 59 and 60 which engage the upper runs of the chains 56 and 57 between the sprocket gears carried by the shafts 27, 28 and 29, said gears acting as chain tighteners so as to hold the said chains firmly engaged with the said sprocket gears 49, 50 and 51 and 52, 53 and 54 carried by the opposite ends of the shafts 27, 28 and 29.

Secured to the opposite sides of the frame in any suitable manner are the inner ends of the beams 61 and 62, said beams being curved upwardly and forwardly and pivotally connected at their forward ends, as indicated at 62' to the substantially horizontal beam 63, the forward end of the latter beam being connected by means of the clevis 64 to a suitable truck or tractor 65. Adapted to be supported by the beam 63 are a number of colters 66, which serve to cut the sod so that the shearing element 15 can properly raise the same. While only one colter has been shown, it is to be understood that any desired number may be employed.

Secured to the beam 63 is the rearwardly and upwardly extending bracket arm 67 secured at its rear end to the segmental ratchet 68. Carried by the rear end of the beam 63 is a link 69 to the upper end of which is pivoted the angularly directed end 70 of the lever 71, said lever being also pivotally connected intermediate its ends, as indicated at 72 to a link 73 carried by the beam 62. Secured to the lever 71 is a pawl 74 actuated by means of the operating rod 75 connected at its outer end to the hand lever 76. It will thus be readily seen that as the lever 71 is rocked about its pivots, the forward end of the frame and the shearing element may be raised or lowered as desired and that the pawl 74 engaging with the teeth of the ratchet 68 will retain the frame and shearing element at the desired height.

Suitably secured to the frame of the machine are the supports 77 for the seat 78 and also suitably carried by the frame and positioned directly in advance of the seat is a safety foot rest 79.

The operation of the machine is as follows:

The forward end of the frame is first either raised or lowered until the shearing element 15 is so positioned as to shear the sod of the required thickness which, as stated above, depends upon the extent of the growth of the quack grass, this adjustment of the shear being accomplished through the medium of the pawl and ratchet means operable in the manner set forth above.

As the machine is then drawn over the ground by horses or a tractor, the sprocket wheels 20 and 21 will be rotated and this rotary movement will be conveyed through the endless chains 56, and 57 to the gears 49, 50 and 51 and gears 52, 53 and 54 respectively carried on the opposite ends of the shafts 27, 28 and 29, thus causing the rotation of the cylinders 30, 31 and 32.

As the shear removes the sod, it is slid rearwardly over the teeth 37 until it is engaged by the teeth 36 of the cylinders 30 and inasmuch as this cylinder rotates in a clockwise direction, the sod will be conveyed by the teeth of the same to cylinder 31 and from the cylinder 31 to cylinder 32.

For the purpose of removing the quack roots from the soil, there is secured to the inner faces of the side walls 10 and 11 the inverted substantially U-shaped bracket 80 carrying the spaced depending teeth 81 which are arranged in staggered relation with the teeth of the cylinder 31. This toothed rake is adapted to hold the quack sod on the cylinder so that the teeth thereof will separate the quack roots from the sod and disintegrate the soil, the soil being permitted to drop back into the furrow, after which the quack roots will be passed along onto the gathering platform or arms 39, where they will be permitted to gravitate to the ground from where they can be readily removed.

From the above, it is believed that the construction and operation of the invention will be sufficiently clear to enable those skilled in the art to make and use the same and that while there has been shown a preferred embodiment of the present invention, it is to be understood that various changes in the details of construction may be found desirable and that any such changes as properly fall within the scope of the appended claims may be resorted to without departing from or sacrificing the spirit of the invention.

What is claimed is:

1. In an agricultural implement of the class described, a frame, an axle carried by said frame adjacent the rear end thereof, ground wheels and a sprocket wheel mounted on said axle, a plurality of cylinders mounted in said frame and provided with intermeshing teeth, sprocket gears carried by said cylinders, an endless chain running over said gears and around said sprocket wheel, a shearing element carried by the frame adjacent the forward end thereof, means for raising and lowering the said shearing element and the front portion of said frame, a toothed rake carried by said frame, the teeth thereof arranged in staggered relation with the teeth of one of said cylinders, and a gathering platform positioned adjacent the rearmost cylinder, said platform comprising a plurality of arms intermeshing with the teeth of the last named cylinder.

2. In an agricultural machine of the class described, a frame, an axle mounted in the frame adjacent the rear end thereof, ground wheels fixed upon the axle, a plurality of cylinders rotatably mounted in said frame and provided with teeth, the teeth upon relatively adjacent cylinders being arranged in staggered relation whereby to intermesh with one another, means actuated through rotation of the axle for imparting rotary motion to the cylinders to effect travel of their upper sides in the direction of the rear end of the frame, a single shearing blade supported at its rear portion in advance of the foremost cylinder and extending the length thereof, the forward edge of the blade being tapered from opposite sides toward the front of the blade, means for supporting the forward end of the frame and operable to effect raising and lowering of the frame, teeth extending upwardly and rearwardly from the rear portion of the shearing blade toward the forward side of the said foremost cylinder for conveying sod to the said cylinder from the blade, means arranged in juxtaposition to the upper side of the cylinder in rear of the foremost cylinder for arresting the motion of the elevated sod to permit of disintegration of the sod and action of the teeth of the said cylinder on the roots therein to carry the roots in a rearward direction, and means in rear of the rearmost cylinder for collecting and depositing the roots comprising a supporting member and a plurality of relatively spaced arms mounted thereon at points adjacent their forward ends, the arms being inclined downwardly and rearwardly from the rear side of the rearmost cylinder and having their forward ends presented toward the said side of the said cylinder and staggered with relation to the teeth of the cylinder.

In testimony whereof I affix my signature.

JOHN ESTELL.